(12) United States Patent
Barsness et al.

(10) Patent No.: US 7,844,853 B2
(45) Date of Patent: Nov. 30, 2010

(54) METHODS AND APPARATUS FOR RESTORING A NODE STATE

(75) Inventors: Eric L. Barsness, Pine Island, MN (US); David L. Darrington, Rochester, MN (US); Amanda E. Peters, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 11/834,807

(22) Filed: Aug. 7, 2007

(65) Prior Publication Data

US 2009/0043873 A1    Feb. 12, 2009

(51) Int. Cl.
*G06F 11/00* (2006.01)

(52) U.S. Cl. .................. 714/6; 714/5; 714/19; 707/202; 707/204

(58) Field of Classification Search .................. 707/202, 707/204; 714/5, 6, 19
See application file for complete search history.

(56) References Cited

U.S. PATENT DOCUMENTS

| | | | | |
|---|---|---|---|---|
| 5,938,775 | A * | 8/1999 | Damani et al. ................. | 714/15 |
| 6,240,527 | B1 * | 5/2001 | Schneider et al. ............. | 714/21 |
| 6,434,681 | B1 * | 8/2002 | Armangau ................... | 711/162 |
| 6,457,123 | B1 * | 9/2002 | Rollins ........................ | 713/100 |
| 7,346,623 | B2 * | 3/2008 | Prahlad et al. ..................... | 1/1 |
| 7,529,785 | B1 * | 5/2009 | Spertus et al. ..................... | 1/1 |
| 7,529,897 | B1 * | 5/2009 | Waldspurger et al. ....... | 711/162 |
| 7,574,458 | B2 * | 8/2009 | Rhodes ............................. | 1/1 |
| 7,627,728 | B1 * | 12/2009 | Roeck et al. ................. | 711/162 |
| 7,685,177 | B1 * | 3/2010 | Hagerstrom et al. .. | 707/999.204 |
| 2002/0049883 | A1 * | 4/2002 | Schneider et al. ............ | 711/100 |
| 2003/0005109 | A1 * | 1/2003 | Kambhammettu et al. .. | 709/224 |
| 2003/0028736 | A1 * | 2/2003 | Berkowitz et al. .......... | 711/162 |
| 2003/0037279 | A1 * | 2/2003 | Laio ............................... | 714/6 |
| 2004/0123183 | A1 * | 6/2004 | Tripathi et al. ................. | 714/31 |
| 2004/0153481 | A1 * | 8/2004 | Talluri ........................ | 707/200 |
| 2004/0236916 | A1 * | 11/2004 | Berkowitz et al. .......... | 711/162 |
| 2005/0028026 | A1 * | 2/2005 | Shirley et al. ................... | 714/6 |
| 2005/0038827 | A1 * | 2/2005 | Hooks ........................ | 707/200 |
| 2005/0039069 | A1 * | 2/2005 | Prahlad et al. .................. | 714/2 |
| 2005/0114402 | A1 * | 5/2005 | Guthrie, II .................. | 707/200 |
| 2005/0182799 | A1 * | 8/2005 | Hitz et al. .................... | 707/202 |
| 2006/0015872 | A1 * | 1/2006 | Pohl et al. .................... | 718/100 |
| 2006/0026319 | A1 * | 2/2006 | Rothman et al. ............ | 710/100 |
| 2006/0053139 | A1 * | 3/2006 | Marzinski et al. ........... | 707/101 |
| 2006/0085679 | A1 * | 4/2006 | Neary et al. ................... | 714/13 |
| 2006/0161757 | A1 * | 7/2006 | Piazza ........................ | 711/171 |
| 2006/0168352 | A1 * | 7/2006 | Gebhart et al. .............. | 709/248 |
| 2006/0200505 | A1 * | 9/2006 | Bhatia ........................ | 707/204 |
| 2006/0212556 | A1 * | 9/2006 | Yacoby et al. .............. | 709/223 |
| 2006/0224636 | A1 * | 10/2006 | Kathuria et al. ............. | 707/200 |
| 2006/0271601 | A1 * | 11/2006 | Fatula et al. ................. | 707/201 |
| 2006/0294435 | A1 * | 12/2006 | Vick et al. ..................... | 714/38 |
| 2007/0006018 | A1 * | 1/2007 | Thompson et al. ............. | 714/6 |
| 2008/0183775 | A1 * | 7/2008 | Prahlad et al. ............... | 707/204 |
| 2008/0301101 | A1 * | 12/2008 | Baratto et al. .................. | 707/3 |
| 2008/0301506 | A1 * | 12/2008 | Chang et al. .................. | 714/57 |
| 2009/0049552 | A1 * | 2/2009 | Williamson et al. ........... | 726/24 |

* cited by examiner

*Primary Examiner*—Robert Beausoliel
*Assistant Examiner*—Joshua P Lottich
(74) *Attorney, Agent, or Firm*—Dugan & Dugan, PC

(57) ABSTRACT

In one aspect of the invention, a method is provided. The method may include: (1) storing a snapshot of a system state of a node; (2) executing a job on the node; and (3) restoring the node to the system state using the stored snapshot of the system state.

22 Claims, 7 Drawing Sheets

METHODS AND APPARATUS FOR RESTORING A NODE STATE

FIELD OF THE INVENTION

The present invention relates generally to parallel computer systems and, more particularly, to methods and apparatus for restoring a node state of a compute node of a parallel computer system.

BACKGROUND

Parallel computer systems may use multiple compute nodes networked together for parallel processing. For example, a massively parallel computer system may use thousands of compute nodes. In a typical parallel computer system, jobs may be scheduled, executed, and completed in a repeating process using one or more of the compute nodes.

SUMMARY OF THE INVENTION

In a first aspect of the invention, a method is provided. The method may include: (1) storing a snapshot of a system state of a node; (2) executing a job on the node; and (3) restoring the node to the system state using the stored snapshot of the system state.

In a second aspect of the invention, an apparatus is provided. The apparatus may include (1) a manager to manage a node, and (2) logic coupled to the manager. The logic may: (a) store a snapshot of a system state of the node; (b) execute a job on the node; and (c) restore the node to the system state using the stored snapshot of the system state.

In a third aspect of the invention, a system may be provided. The system may include: (1) a management node; (2) a node; and (3) logic, coupled to the management node. The logic may (a) store a snapshot of a system state of the node; (b) execute a job on the node; and (c) restore the node to the system state using the stored snapshot of the system state.

Other features and aspects of the present invention will become more fully apparent from the following detailed description, the appended claims and the accompanying drawings.

DETAILED DESCRIPTION

During the repeating process of jobs being scheduled, executed and completed on nodes of a parallel computer system, a job may not complete cleanly. For example, a job may leave an orphaned process, an open file or a temporary process on a compute node. Such a job may consume node memory and may cause subsequent jobs to fail or to perform poorly. Thus, it may be desirable to return nodes to a known state after execution of a job.

A node may be returned to a known state by rebooting the node. However, rebooting may be time consuming and may cause excessive network traffic that may affect jobs running on other system resources. Further, rebooting may not always return a node to a known state. The asynchronous nature of booting may lead to a node having a different physical memory allocation that it did following a previous boot. Another solution may be to run a 'scrubbing' program that may kill orphaned processes and reclaim resources. However, scrubbing programs may be error prone and, as with rebooting, may not always return a node to a known state.

The present invention provides improved methods and apparatus for restoring a node state of a compute node of a parallel computer system, such as a massively parallel computer system (or high performance cluster system). More specifically, a snapshot of a system state of a compute node may be stored in a computer storage (e.g., a volatile or a nonvolatile memory or storage or other device to retain data). A job may be executed on the compute node. The compute node may be restored using the stored snapshot of the system state. Alternatively or additionally, a location of a computer storage to store the snapshot of the compute node may be determined. Alternatively or additionally, a determination as to whether to compress the snapshot (and to what degree) may be made. Consequently, a node state of a compute node may be restored more effectively and efficiently. Specifically, restoring the node state may be faster than rebooting the node state. Further, restoring the node state to a known state may increase repeatability in job execution. Additionally, determining a location of a computer storage to store the snapshot may enable application in varying job conditions (e.g., jobs that are memory constrained but not network limited, and jobs that are network limited but not memory constrained).

Figure 1A:
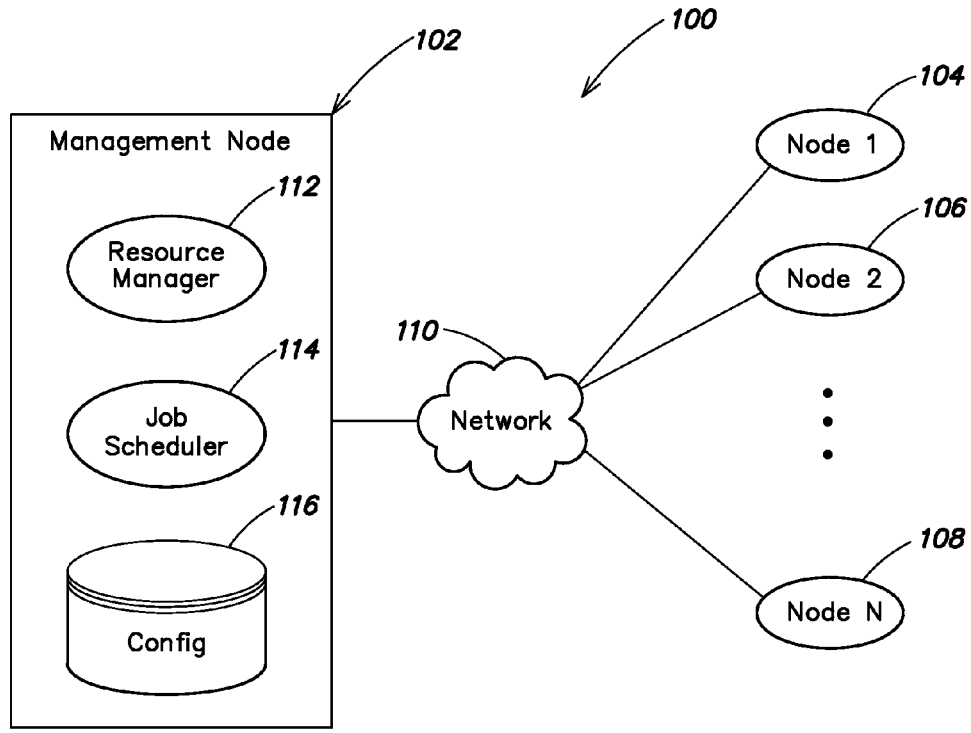
FIG. 1A is a block diagram of an exemplary parallel computer system in which the present methods and apparatus may be implemented.

FIG. 1A is a block diagram of an exemplary parallel computer system 100 in which the present methods and apparatus may be implemented. The parallel computer system 100 may include a management node 102 and compute nodes 104, 106, 108. The management node 102 and the compute nodes 104, 106, 108 may each be connected via a network 110.

The management node 102 may include a resource manager 112 and a job scheduler 114. The resource manager 112 may be a software program for allocating resources, allocating the compute nodes 104, 106, 108 and booting the compute nodes 104, 106, 108. The job scheduler 114 may be a software program for launching jobs on particular compute nodes 104, 106, 108 or groups of compute nodes 104, 106, 108.

Figure 1B:
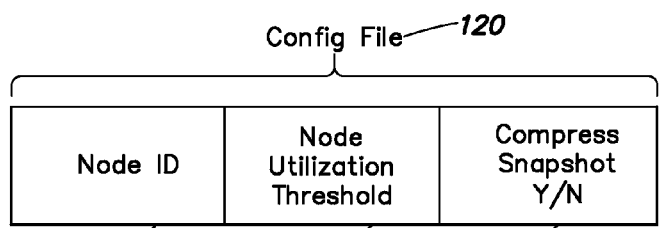
FIG. 1B is a schematic representation of an exemplary configuration file in accordance with an embodiment of the present invention.

The management node 102 may include a config database 116. The config database 116 may include one or more config files 120 (FIG. 1B). A config file 120 may include a node id 122, a node utilization threshold 124 and a snapshot compression indicator 126. The config file 120 may be used by the control system (job scheduler 114/resource manager 112) to determine when to snapshot a system state, when/how much to compress the snapshot, and where to store the snapshot.

The management node 102 may include a system state 130 (FIG. 1C) for a particular compute node 104, 106, 108. The system state 130 may be accessed by the resource manager 112 and/or the job scheduler 114. The system state 130 may include a node id 132, an idle indicator 134, a predicted free memory amount 136, a predicted CPU utilization 138 and a predicted snapshot size 140. The system state 130 may be used by the control system (job scheduler 114/resource manager 112) to determine when to snapshot a system state, when/how much to compress the snapshot, and where to store the snapshot.

Figure 1C:
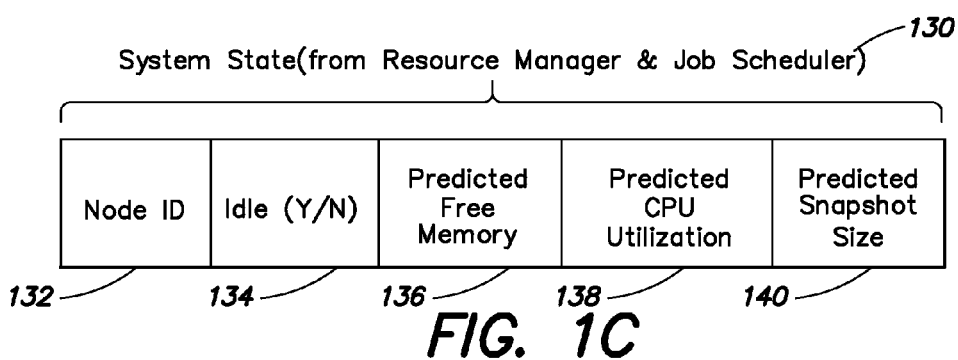
FIG. 1C is a schematic representation of an exemplary system state in accordance with an embodiment of the present invention.
Figure 2:
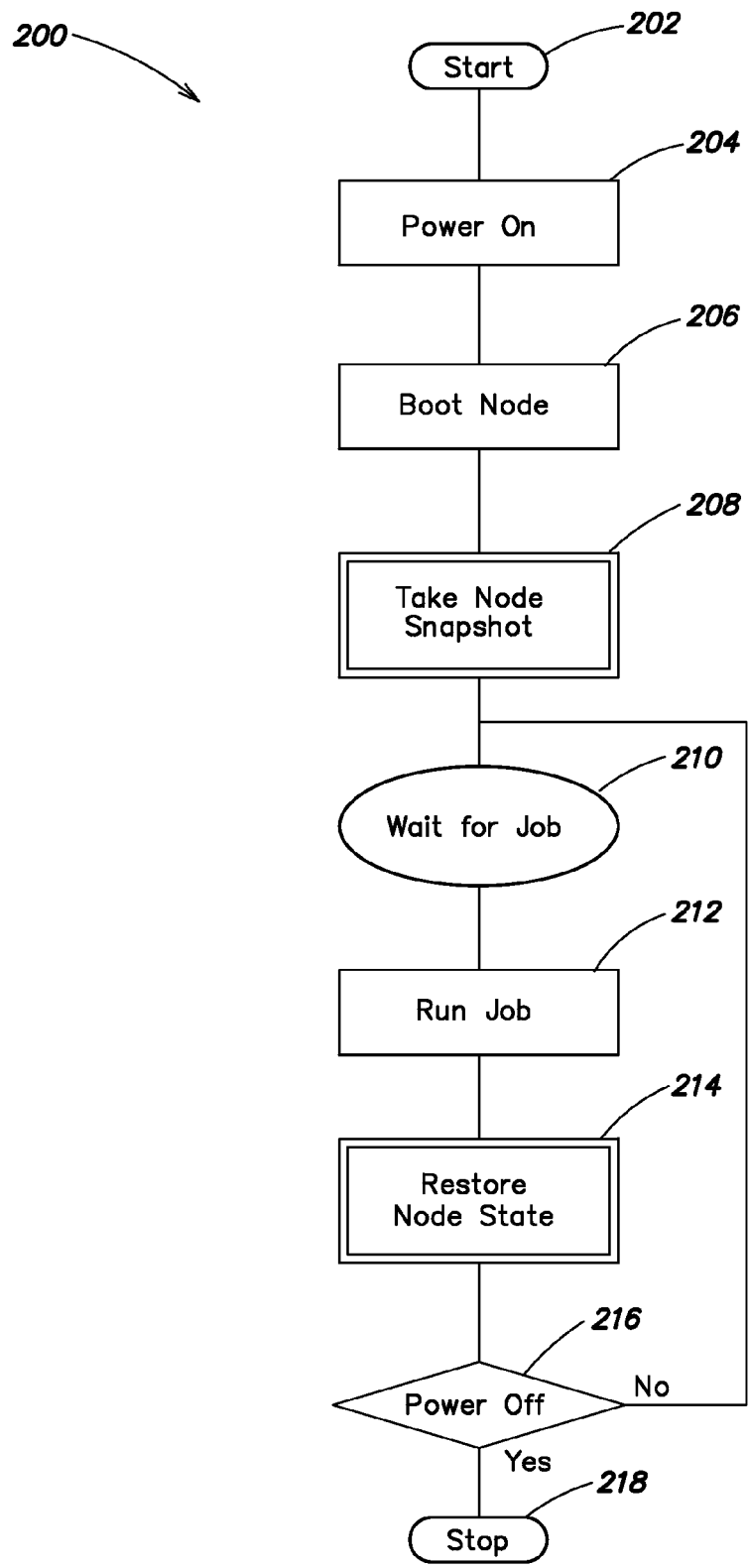
FIG. 2 illustrates an exemplary method for restoring a node state in accordance with an embodiment of the present invention.

The operation of the parallel computing system 100 is now described with reference to FIGS. 1A, 1B and 1C, and with reference to FIGS. 2-7 which illustrate, inter alia, an exemplary method 200 for restoring a node state in accordance with an embodiment of the present invention. With reference to FIG. 2, in operation 202, the method 200 may begin. In operation 204, a compute node, 104 in this example, may be powered on. In operation 206, the compute node 104 may be booted. In operation 208, a snapshot of a particular system state of the compute node 104 may be taken. The snapshot may include a device state and a memory state. The snapshot may be a copy of active memory of the compute node 104. In operation 210, the compute node 104 may wait for a job. In operation 212, a job may be run (or executed) on the compute node 104. In operation 214, the compute node 104 may be restored to the particular system state using the snapshot of the particular system state taken in operation 208. A non-limiting exemplary method for restoring a system state of a personal computer to control power consumption is described in U.S. Pat. No. 5,784,628, assigned to Microsoft Corporation, which is herein incorporated by reference in its entirety. In operation 216, a determination may be made whether to power off the compute node 104. If a decision is made to power off the compute node 104, the method 200 may end in operation 218. If a decision is made not to power off the compute node 104, operations 210, 212, 214 and 216 may be repeated.

Figure 3:
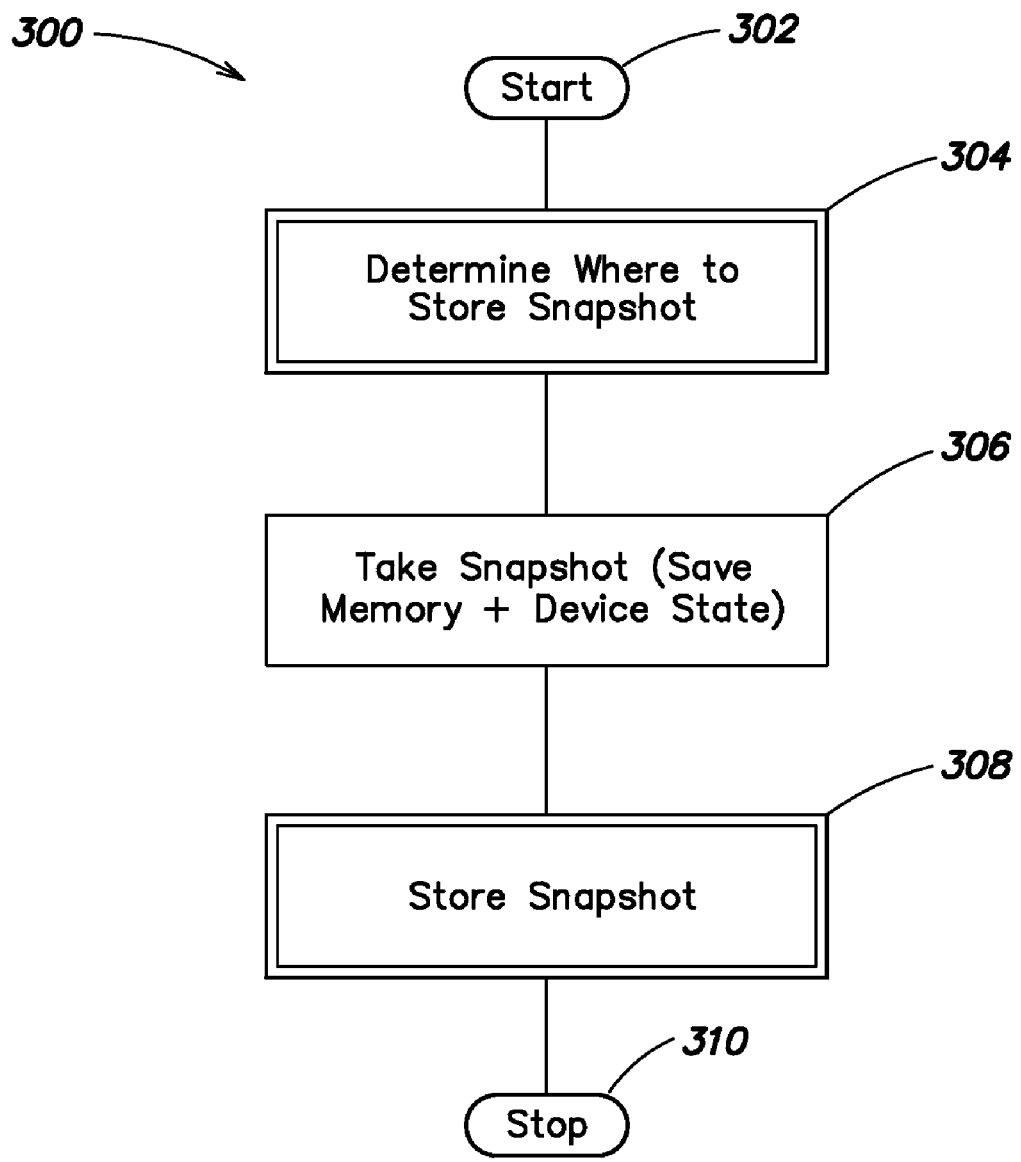
FIG. 3 illustrates an exemplary method of operation 208 of FIG. 2.

FIG. 3 illustrates an exemplary method 300 of operation 208 of FIG. 2, in which the snapshot of the particular system state may be taken. In operation 302, the method 300 may begin. In operation 304, a location of a computer storage to store the snapshot of the particular system state of the compute node 104 may be determined. In operation 306, the snapshot of the particular system state may be taken. In operation 308, the snapshot may be stored in the location determined in operation 304. The method 300 may end in operation 310.

Figure 4:
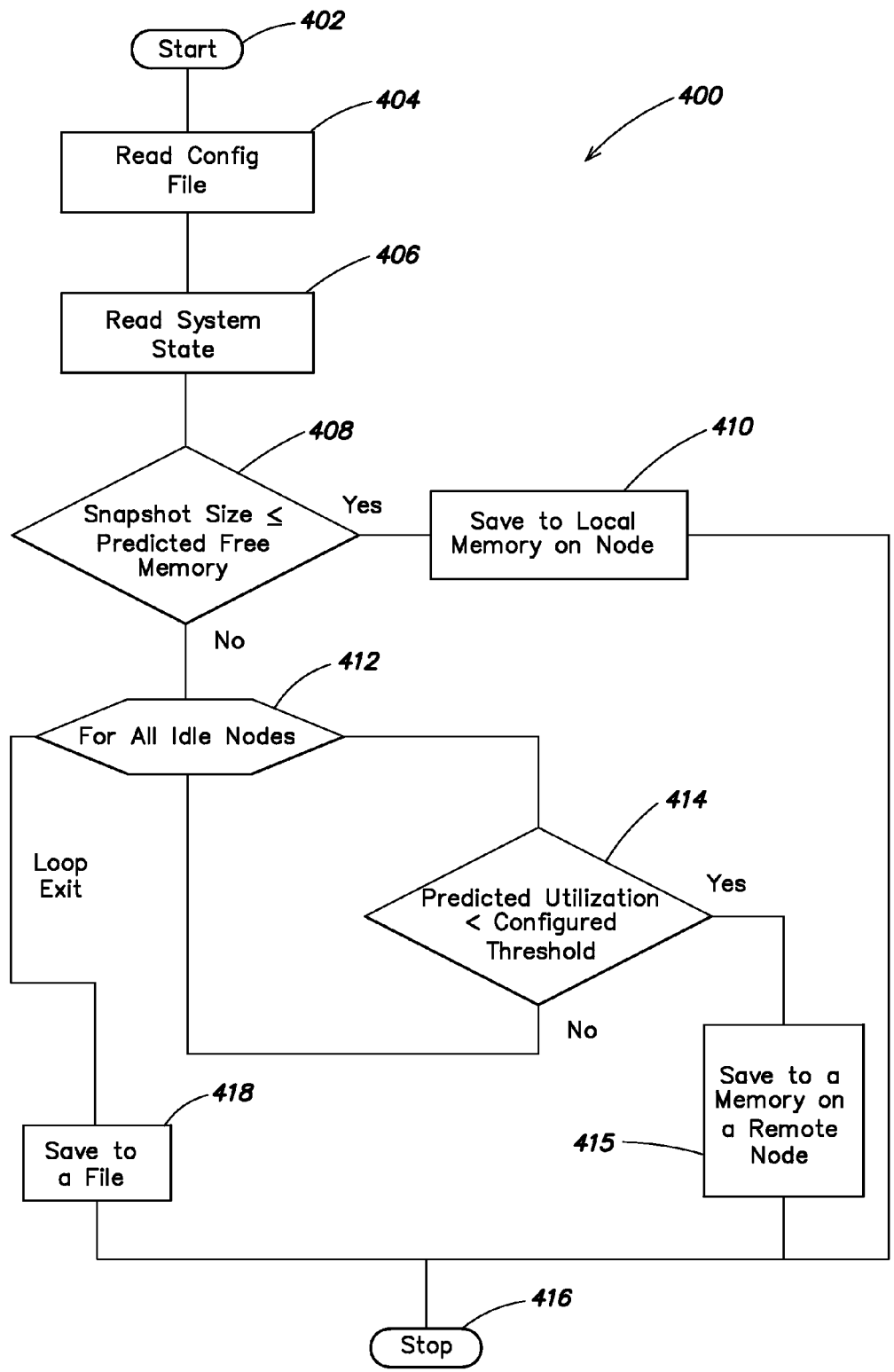
FIG. 4 illustrates an exemplary method of operation 304 of FIG. 3.

FIG. 4 illustrates an exemplary method 400 of operation 304 of FIG. 3, in which the location of the computer storage to store the snapshot of the particular system state may be determined. Generally, multiple decision points (or factors) may be taken into consideration in determining the location of the computer storage. These factors may include current and predicted system network utilization, predicted/requested memory requirements of the job to be run, and the number of nodes required by future jobs. Based on these factors, the location of the computer storage may be a reserved area in local memory of the compute node, in a network attached file (or file storage), or on a node that will not be used for the job.

In operation 402, the method 400 may begin. In operation 404, a config file 120 may be read. In operation 406, a system state 408 may be read. In operation 408, a determination may be made whether a size of the snapshot is less than or equal to an amount of predicted free memory of the compute node 104. If a decision is made that the size of the snapshot is less than or equal to the amount of predicted free memory of the compute node 104, the memory of the compute node 104 may be designated as the location of the computer storage to store the snapshot in operation 410, and the method 400 may end in operation 416. The snapshot may be stored in the memory of the compute node 104 in a reserved area. If a decision is made that the size of the snapshot is greater than the amount of predicted free memory of the compute node 104, an operation for each idle compute node of the remaining compute nodes 106, 108 may be performed in operations 412 and 414. In operation 414 a determination may be made whether the predicted CPU utilization 138 of an idle compute node is less than a configured threshold 124. If the predicted CPU utilization 138 of the idle compute node is less than a configured threshold 124, a memory of the idle compute node may be designated as the location of the computer storage to store the snapshot in operation 415, and the method 400 may end in operation 416. If the predicted CPU utilization 138 of the idle compute node is greater than a configured threshold 124, operation 414 may be repeated for another idle compute node. If the predicted CPU utilization 138 of all idle compute nodes is greater than the configured threshold 124, a file (or file storage) may be designated as the location of the computer storage in operation 418, and the method 400 may end in operation 416. The file may be a network-attached file. Alternative or additionally, the file may be a local disk or disk cluster.

Figure 5:
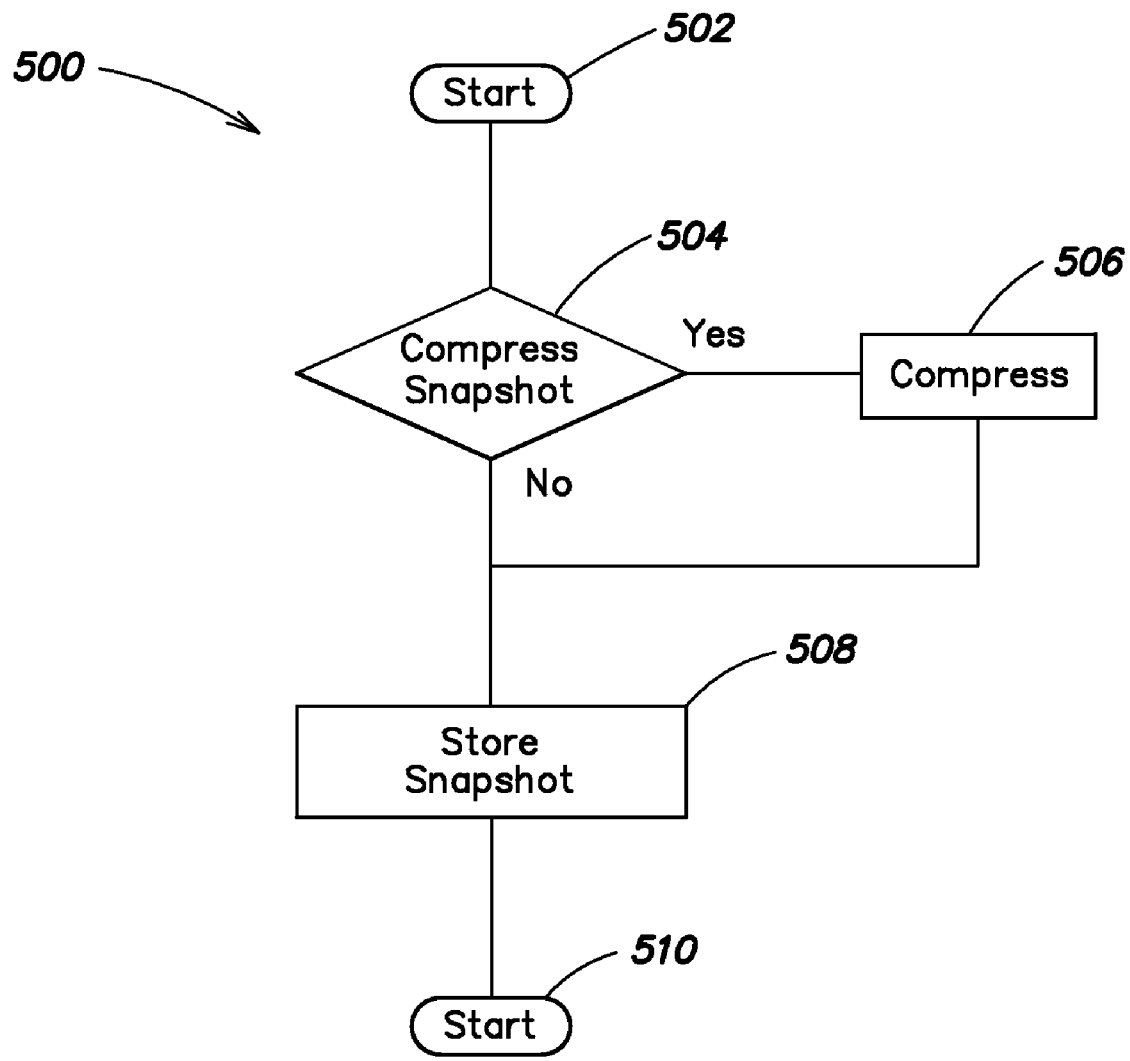
FIG. 5 illustrates an exemplary method of operation 308 of FIG. 3.

FIG. 5 illustrates an exemplary method 500 of operation 308 of FIG. 3, in which the snapshot may be stored in the location determined in operation 304. In operation 502, the method 500 may begin. In operation 504, a determination may be made whether to compress the snapshot. If a decision is made to compress the snapshot, the snapshot may be compressed in operation 506, and then stored in operation 508. If a decision is made not to compress the snapshot, the snapshot may be stored in operation 508. The method 500 may end in operation 510.

Figure 6:
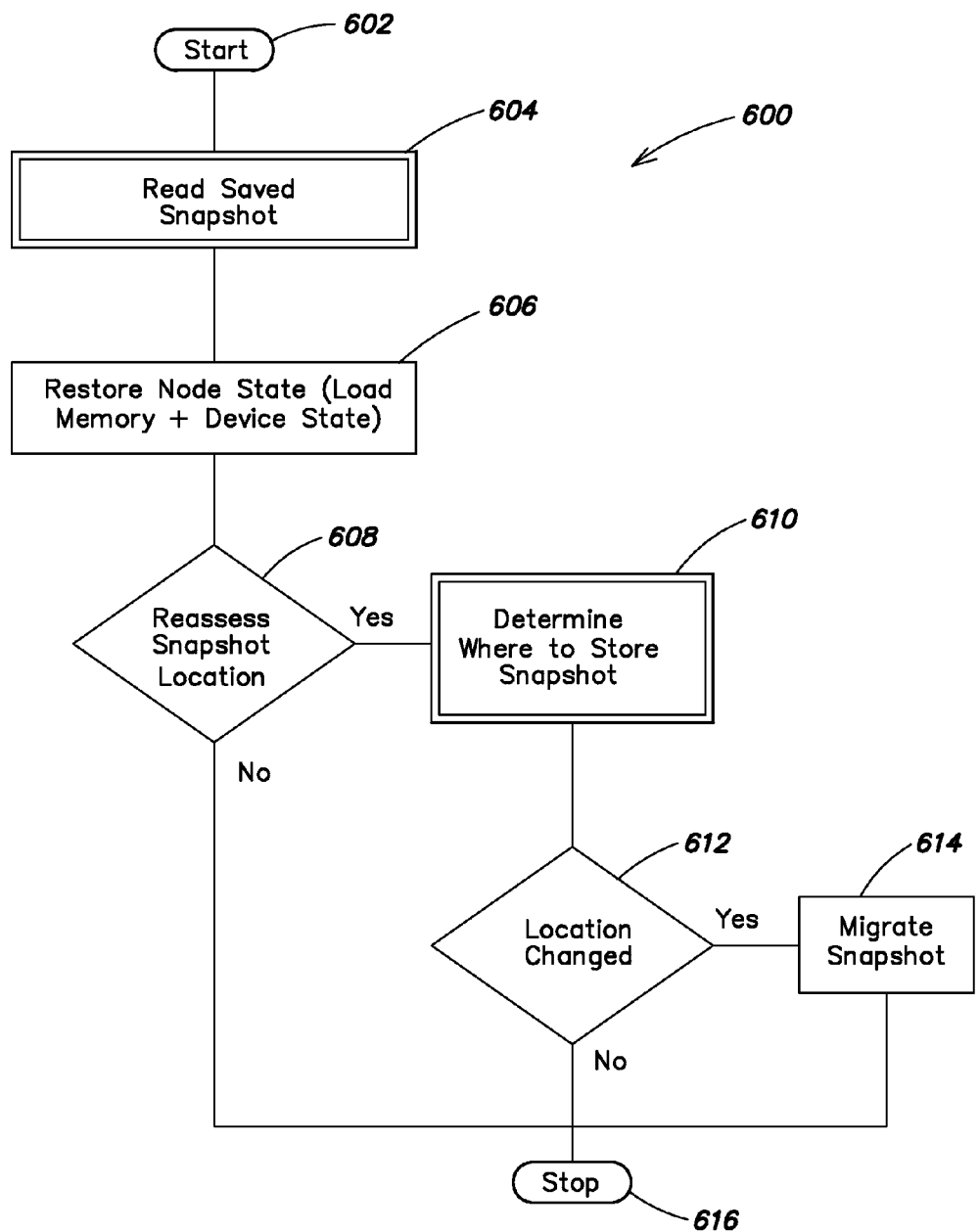
FIG. 6 illustrates an exemplary method of operation 214 of FIG. 2.

FIG. 6 illustrates an exemplary method 600 of operation 214 of FIG. 2, in which the compute node 104 may be restored to the particular system state using the snapshot of the particular system state taken in operation 208. In operation 602, the method 600 may begin. In operation 604, a stored snapshot may be read. In operation 606, the particular system state may be restored. In operation 608, a determination may be made whether to reassess the location of the computer storage. If a decision is made to reassess the location of the computer storage, the location of the computer storage to store the snapshot of the particular system state may be determined in operation 610. Operation 610 may be similar to operation 304. In operation 612, a determination may be made whether the location of the computer storage should be changed. If a decision is made that the location of the computer storage should be changed, the snapshot may be migrated to the new computer storage location in operation 614, and the method 600 may end in operation 616. If a decision is made not to reassess the location of the computer storage, the method 600 may end in operation 616. If a decision is made that the location of the computer storage should not be changed, the method 600 may end in operation 616.

Figure 7:
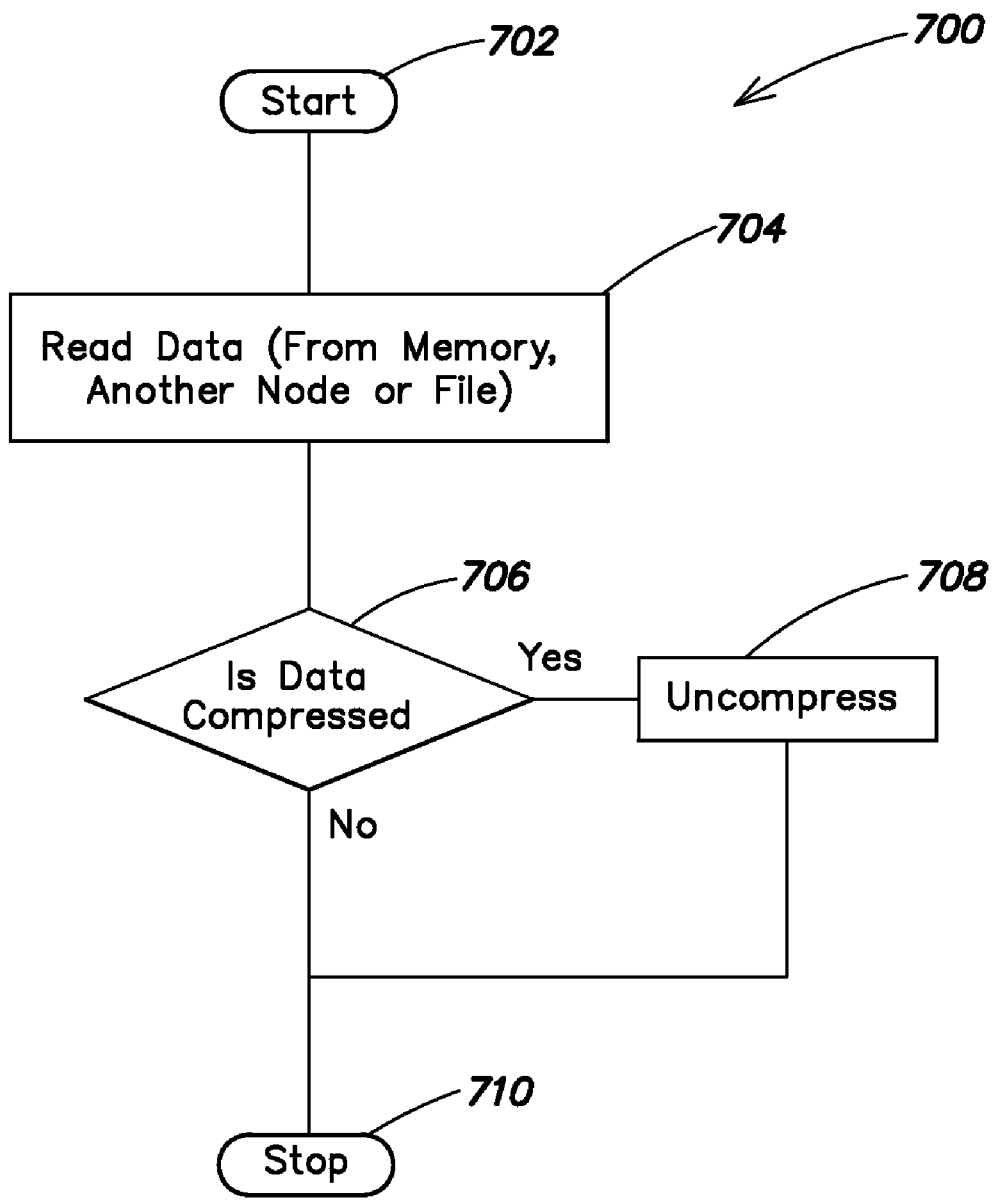
FIG. 7 illustrates an exemplary method of operation 604 of FIG. 6.

FIG. 7 illustrates an exemplary method 700 of operation 604 of FIG. 6, in which the stored snapshot may be read. In operation 702, the method 700 may begin. In operation 704, the snapshot may be read. Depending on the storage location of the snapshot, the snapshot may be read from the memory of the compute node 104, the memory of another idle compute node, or a file. In operation 706, a determination may be made whether the snapshot is compressed. If the snapshot is compressed, the snapshot may be uncompressed in operation 708, and the method 700 may end in operation 710. If the snapshot is not compressed, the method 700 may end in operation 710.

The foregoing description discloses only exemplary embodiments of the invention. Modifications of the above-disclosed embodiments of the present invention of which fall within the scope of the invention will be readily apparent to those of ordinary skill in the art. For instance, although the embodiments are described with respect to a parallel computer system 100, in other embodiments, systems and apparatus may be applied in other multi-node (or cluster) environments. The concepts described herein may also apply in a virtualized computer system. For example, a physical system snapshot may contain the state of multiple virtual machines, thereby allowing the saving of the state of multiple machines in a single snapshot, and the restoration of multiple machines using a single snapshot. The concepts relating to choosing a location to store a snapshot may be may be used by a virtualized computer system. In a virtual machine of such a system, the machine may be defined and accessed as any other physical device. However, the virtual machine may represent many possible physical locations, as determined by methods similar to those described herein in determining a location to store a snapshot. Further, although in some embodiments the resource manager 112, job scheduler 114, and config database 116 may be located in the management node 102, in other embodiments, the resource manager 112, job scheduler 114 and config database 116 may be located elsewhere in the parallel computer system 100. Further, although various features have been discussed as hardware or software, in other embodiments, different combinations of hardware and software may be possible. For example, although the resource manager 112 and the job scheduler 114 may be software, in other embodiments, the resource manager 112 and the job scheduler 114 may be hardware or a combination of software and hardware. Further, although in some embodiments, various operations may be relative to others, in other embodiments, different arrangements of the operations may be possible. Moreover, although in some embodiments, the snapshot may be stored in a memory of a node, a memory of a remote node, or a file storage, in other embodiments, the snapshot may be stored elsewhere.

Accordingly, while the present invention has been disclosed in connection with exemplary embodiments thereof, it should be understood that other embodiments may fall within the spirit and scope of the invention as defined by the following claims.

The invention claimed is:

1. A method, comprising:
storing a snapshot of a system state of a node;
executing a job on the node; and
upon completion of the job, restoring the node to the system state using the stored snapshot of the system state.

2. The method of claim 1, wherein the storing of the snapshot of the system state of the node comprises storing a device state and a memory state of the node.

3. The method of claim 1, wherein the storing of the snapshot of the system state of the node comprises:
booting the node;
taking the snapshot of the system state of the node; and
storing the snapshot of the system state of the node in a computer storage.

4. The method of claim 3, wherein the storing of the snapshot of the system state of the node further comprises compressing the snapshot of the system state of the node.

5. The method of claim 4, wherein the restoring of the node to the system state using the stored snapshot of the system state comprises uncompressing the compressed snapshot of the system state of the node.

6. The method of claim 3, wherein the storing of the snapshot of the system state of the node further comprises determining a location of the computer storage.

7. The method of claim 6, wherein the determining of the location of the computer storage comprises:
determining an amount of predicted free memory of the node; and
designating a memory of the node as the computer storage if a size of the snapshot of the system state of the node is less than or equal to the amount of predicted free memory of the node.

8. The method of claim 6, wherein the determining of the location of the computer storage comprises:
determining an amount of predicted free memory of the node; and
designating a memory of a remote node as the computer storage if a size of the snapshot of the system state of the node is greater than the amount of predicted free memory of the node.

9. The method of claim 6, wherein the determining of the location of the computer storage comprises:
determining an amount of predicted free memory of the node; and
designating a file as the computer storage if a size of the snapshot of the system state of the node is greater than the amount of predicted free memory of the node.

10. The method of clam 6, further comprising:
after restoring the node to the system state using the stored snapshot of the system state, repeating the determining of a location of the computer storage; and
migrating the snapshot of the system state of the node to a different computer storage if an outcome of the repeated determination is different than a first outcome of the determination.

11. An apparatus, comprising:
a manager to manage a node; and
logic, coupled to the manager, and to:
store a snapshot of a system state of the node;
execute a job on the node; and
upon completion of the job, restore the node to the system state using the stored snapshot of the system state.

12. The apparatus of claim 11, wherein the logic coupled to the manager to store the snapshot of the system state of the node comprises logic to store a device state and a memory state of the node.

13. The apparatus of claim 11, wherein the logic coupled to the manager to store the snapshot of the system state of the node comprises logic to:
boot the node;
take the snapshot of the system state of the node; and
store the snapshot of the system state of the node in a computer storage.

14. The apparatus of claim 13, wherein the logic coupled to the manager to store the snapshot of the system state of the node further comprises logic to compress the snapshot of the system state of the node.

15. The apparatus of claim 14, wherein the logic coupled to the manager to restore the node to the system state using the stored snapshot of the system state comprises logic to uncompress the compressed snapshot of the system state of the node.

16. The apparatus of claim 13, wherein the logic coupled to the manager to store the snapshot of the system state of the node further comprises logic to determine a location of the computer storage.

17. The apparatus of claim 16, wherein the logic coupled to the manager further comprises logic to:
   after restoring the node to the system state using the stored snapshot of the system state, again determine the location of the computer storage; and
   migrate the snapshot of the system state of the node to a different computer storage if the again determined location is different than a first determined location.

18. The apparatus of claim 11, wherein the logic coupled to the manager to store the snapshot comprises logic to store the snapshot in one of a memory of the node, a memory of a remote node, or a file storage.

19. A system, comprising:
   a management node;
   a node; and
   logic, coupled to the management node, to
      store a snapshot of a system state of the node;
      execute a job on the node; and
      upon completion of the job, restore the node to the system state using the stored snapshot of the system state if the completed job has left an orphaned process, an open file or a temporary process.

20. The system of claim 19, wherein the node comprises a memory, and wherein the logic coupled to the management node to store the snapshot comprises logic to store the snapshot in the memory of the node.

21. The system of claim 19, further comprising a remote node including a memory, wherein the logic coupled to the management node to store the snapshot comprises logic to store the snapshot in the memory of the remote node.

22. The system of claim 19, further comprising a file storage, wherein the logic coupled to the management node to store the snapshot comprises logic to store the snapshot in the file storage.

* * * * *